United States Patent [19]

Mayer et al.

[11] Patent Number: 4,954,896
[45] Date of Patent: Sep. 4, 1990

[54] ELECTRONIC PROJECTOR SYSTEM SUCH AS A HIGH DEFINITION TELEVISION (HDTV) PROJECTION TELEVISION SYSTEM OR THE LIKE HAVING A FLUID THEREIN WITH INCREASED RESISTANCE TO DAMAGE FROM PROJECTION SYSTEM RADIATION

[75] Inventors: Stefan Mayer; Susanne Schmidt, both of Berlin, Fed. Rep. of Germany

[73] Assignee: Heinrich-Hertz-Institut für Nachrichtentechnik Berlin GmbH, Berlin, Fed. Rep. of Germany

[21] Appl. No.: 473,314

[22] Filed: Feb. 1, 1990

[30] Foreign Application Priority Data

Feb. 8, 1989 [DE] Fed. Rep. of Germany ....... 3904264

[51] Int. Cl.⁵ .............................................. H04M 5/74
[52] U.S. Cl. ................................................... 358/234
[58] Field of Search ................................ 358/233, 234

[56] References Cited

U.S. PATENT DOCUMENTS 2,169,838  8/1939  Herbst ................................. 358/234
3,125,634  3/1964  Murray et al. ...................... 358/234
3,125,636  3/1964  Klebe ................................... 358/234
3,270,133  8/1966  Holub .................................. 358/234
3,288,927  11/1966 Plump ................................. 178/7.5
3,317,664  5/1967  Perlowski, Jr. .................... 358/234
3,317,665  5/1967  Perlowski, Jr. .................... 178/7.5
3,541,992  11/1970 Herrick ............................... 358/234
3,715,494  2/1973  Perlowski, Jr. .................... 358/234

OTHER PUBLICATIONS

Von Hans-Jürgen Ehrke et al., Light Valve Projector for HDTV w/1600 Im Light Output Using a 400 W. Lamp, 4/9/85, pp. 257-262, "Frequenz" Magazine, 4/9/85 Issue, pp. 257-262.
Von Gerhard Mahler, Frequenz, No. 37 (1983), 11/12, pp. 300-306.

Primary Examiner—Edward L. Coles, Sr.
Attorney, Agent, or Firm—Nils H. Ljungman

[57] ABSTRACT

An electronic projector system having a fluid, preferably an oligo (phenylenemethylene) resorcinol, having optical and improved hydromechanical, hydrodynamic, electrical and other physical and chemical properties oriented to HDTV requirements, and thus to provide measures suitable for widespread application regarding resistance to radiation damage.

21 Claims, 1 Drawing Sheet

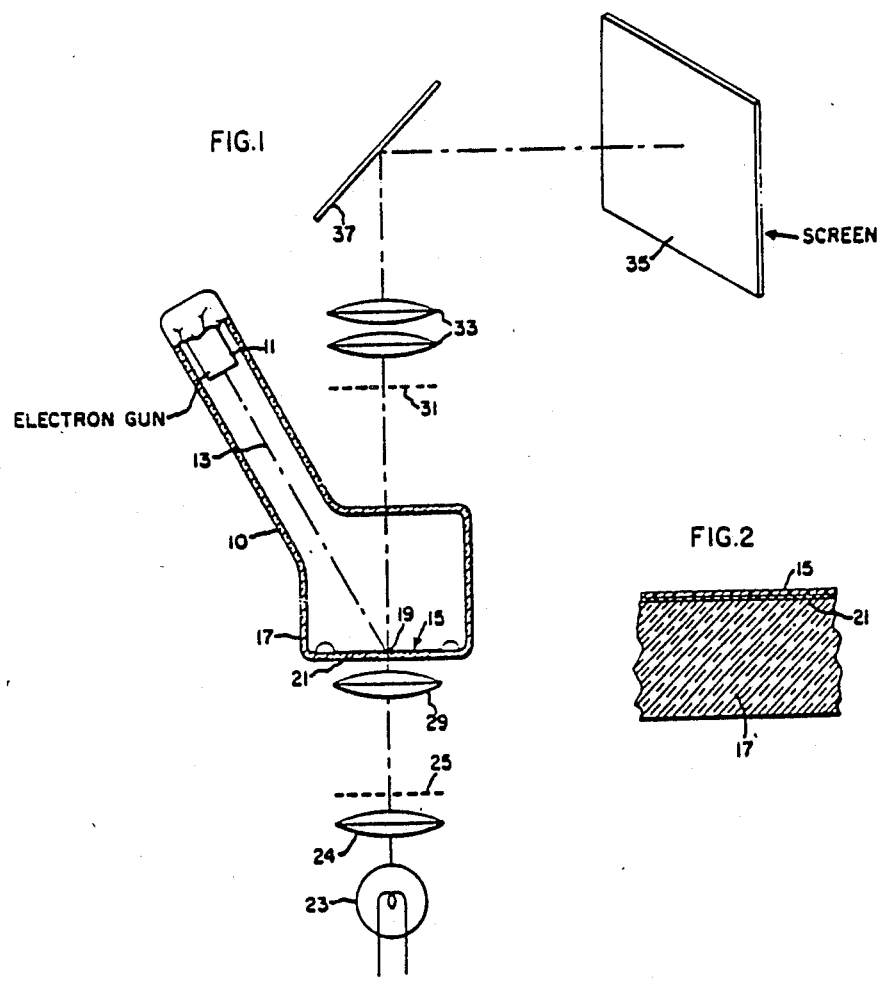

ELECTRONIC PROJECTOR SYSTEM SUCH AS A HIGH DEFINITION TELEVISION (HDTV) PROJECTION TELEVISION SYSTEM OR THE LIKE HAVING A FLUID THEREIN WITH INCREASED RESISTANCE TO DAMAGE FROM PROJECTION SYSTEM RADIATION

BACKGROUND OF THE INVENTION

1. Field of the Invention

This invention relates to electronic projection systems and more particularly to electronic projection systems for high definition television systems which have a fluid therein which has an increased resistance to damage from projection system radiation.

2. Description of the Prior Art

The prior art is represented by DE-OS No. 22 03 576 which is equivalent to U.S. Pat. No. 3,715,494 and which discloses an electronic projection system. There, a deformable medium used as a control coating for a light valve must meet optical, hydromechanical, hydrodynamic and electrical requirements, and must be as insensitive as possible to the damages caused by radiation which are unavoidable on account of the electron beams acting as controlled variables on the medium. The additive, a 9,10 anthracene derivative, used to reduce damage to the deformable surface according to this prior art, when used with a polybenzyl-toluene material disclosed in U.S. Pat. No. 3,288,927 as a basic material, leads to an increase in the service life by a factor of more than 16.

On the basis of purely practical considerations, the absolute value for the service life of such a medium or fluid should be on the order of 10,000 hours. This value, given an operating time for a light valve projector of 5 hours/day, corresponds to a service life of 2,000 days, or approximately 5 years. It can be surmised that such values are reached or exceeded by known media for control coatings.

The number of competitors worldwide in this special field is small. The applicants and assignees of the present invention have drawn on the competitors; experience and results achieved over approximately two decades and have been engaged, in new research and development work, which research is concerned with large screen reproduction of high-resolution color television pictures such as HDTV (High Definition Television). Reports on the possibilities of light valve large-screen projection for HDTV have appeared, for example, in the publication FREQUENZ, No. 37 (1983) 11/12, Pages 300 to 306, along with an article in the same publication concerning a light valve projector for HDTV having a luminous flux of 1,600 lm at 400 W lamp output, No. 39 (1985) 9, Pages 257 to 262.

OBJECT OF THE INVENTION

Accordingly, the object of the present invention is to make available a fluid having optical and improved hydromechanical, hydrodynamic, electrical and other physical and chemical properties oriented to HDTV requirements, and thus to provide measures suitable for widespread application, i.e. in particular for known control coating media, regarding resistance to radiation damage. An additional object of the invention is to open up applications, for example, in electron microscopy—the fluid as a protective layer for organic thin films—to increase the conductivity of polymers—to counteract electrostatic charges—etc.

SUMMARY OF THE INVENTION

The solution proposed by the invention is based on the technical theory explained infra. The additive—also designated polybenzyl resorcinol—is of essential importance—with its characteristics, and the characteristics resulting from the interaction of the additive with the basic material and with other additives if any. These characteristics and interactions will be explained in greater detail below, but are designated as such below, namely:

Action as radical scavenger and reaction inhibitor;
High reactivity to hydrogen, i.e. high hydrogen bonding property;
Tenside action;
Increased thermal and electrical conductivity:
Reduction of surface tension
Makes it possible to use basic materials having lower viscosity.

BRIEF DESCRIPTION OF THE DRAWINGS

FIG. 1 shows a schematic diagram of a projection system.

FIG. 2 shows an enlargement of a part of the system of FIG. 1.

DESCRIPTION OF THE PREFERRED EMBODIMENT

Particularly preferred embodiments of the invention are described infra. These embodiments relate to possibilities of influencing the properties of such fluids, which retain a long-term increased resistance to radiation damage.

As a fluid for thin dielectric coatings having electrostatically deformable surfaces, the advantages of the invention lie primarily in higher resolution limits, i.e. finer grid structures for HDTV. The transmission of penetrating light is closely related to other functional units of a light valve projector, namely the slotted apertures at the input and output, with regard to their grid dimensions. The behavior over time of the fluid after the application of an image pattern to produce the grid structures is also of considerable importance. In comparison to the excitation of the luminous matter in cathode ray tubes, of course, there is a more rapid rise time with light valve projectors, but a relatively very slow decay is desirable. The frequency response and the time constants of such a control coating are functions in a complicated manner of the parameters which are characteristic to the fluid, in particular from a hydrodynamic and electrical point of view.

The decisive features regarding decomposition phenomena for the embodiments according to the invention are the structure, reactivity and chemical properties, as well as their interactions with the basic material and the additives in question.

The following remarks relate to typically important parameters of such fluids, and are intended to give some insight into the complicated interrelationships.

First, it should be noted that high-energy radiation in any case causes a decomposition of the fluid in question. Since with light valve projectors, an electron beam is required to produce the diffraction grid on the control coating, decomposition of the fluid is generally unavoidable. All that can usually be achieved is a reasonable and appropriate limitation and control of such phenomena.

The electrical conductivity is often among the most important parameters. The electrical conductivity typically has a direct effect on the surface charge density. There are indirect effects resulting from the deformability of the fluid, i.e. the rate of the construction and decomposition of the grid structures resting on the surface of thin film coatings as a result of electrostatic deformation. For some embodiments of the invention, the conductivity of the fluid can be increased by an additive by a factor of up to approximately $10^5$ at 20 degrees C., and up to $10^4$ at 100 degrees C., compared to the conductivity of a basic material.

The thermal conductivity of the fluid can also be increased by the addition of oligo(phenylenemethylene) resorcinol to the basic material. On account of the more rapid heat exchange which thereby takes place, local thermal loads are typically reduced.

With regard to the structure, reactivity and chemical properties, the usual action of the additive according to the invention as a radical scavenger, reaction inhibitor and hydrogen scavenger is generally of essential importance. This additive itself easily forms radicals, as shown by Reaction Equation (1);

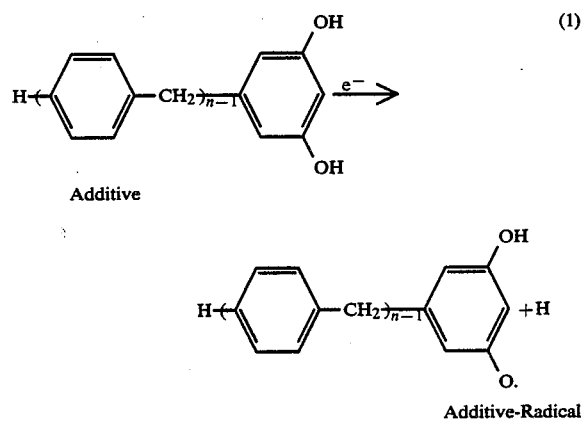
Additive
Additive-Radical

Where n is between 3 and 12. Longer chain lengths result in higher viscosity.

In the basic materials having the general formula (2)

$$H(C_6H_4CH_2)_mR \quad (2)$$

in particular with an oligo(phenylenemethylene) having the Formula (3):

radicals are also formed in the electron beam, e.g. with a $C_8H_4$—$CH_2$-element (In Formula (3), this element should be one which is between the x and y partial chains), a hydrogen H is radically eliminated from the phenylene $C_6H_4$. At this point, a reaction takes place between the additive radical (See (1)) and the basic material radical, so that there is an oligomeric ether, e.g. as described by Formula (4):

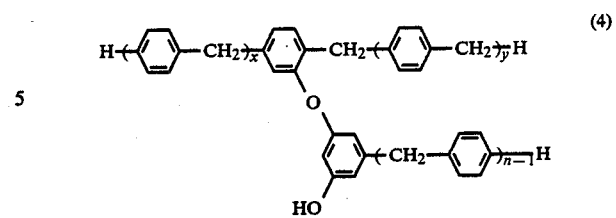

It is especially advantageous that probably the reaction which results in an ether having Formula (4) is preferred, rather than reactions between basic material radicals. The result is a defined decomposition product, at least predominantly, which does not cause any significant disadvantageous change in the characteristics of the fluid. In any case, undesirable chain elongations, irreversible cross-linkings and bi-radicals which cause fluorene units in the chain, are significantly reduced.

The additive according to the invention, which is present partly in tautomeric keto form, is also an excellent hydrogen scavenger, i.e. it has a high reactivity to hydrogen (See Formula (5)):

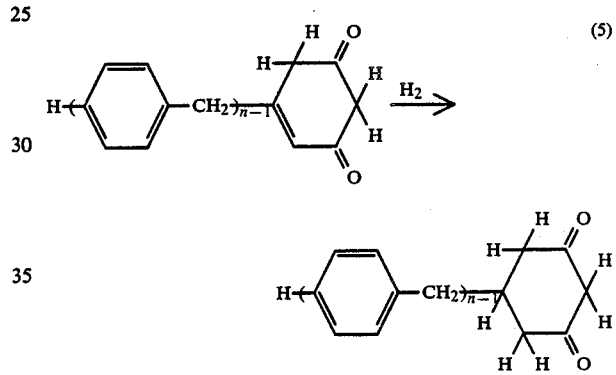

That means that when an electron beam strikes molecule chains of the basic substance and additives, the hydrogen released is then bonded as shown in formula (5). Thus the danger of a pressure increase in the high vacuum of the light valve can be reduced, the load on an ion getter pump can be significantly reduced or even eliminated, and the life of the electron gun in the light valve can be increased.

In addition, and of utmost importance, is the tenside behaviour (tenside action) of the additive. The molecules having tenside action are enriched on the surface or interfaces, and this enrichment causes a reduction of the surface or interfaced tension. With the additive according to the invention, the portion with the terminal resorcinol group exhibits high affinity for strongly-polar substances. A polar, electrically conductive surface, e.g. of transparent indium tin oxide (ITO) as a backplate electrode for the electrostatic deformation of the homogeneous thin fluid coating, can also be wetted better at higher temperatures (smaller wetting angle), i.e. the danger of the tearing of thin film coatings is reduced, and thus the formation of the finer grid structures required for HDTV having sufficient depth of deformation is optimized.

The additive according to the invention makes possible the use of basic materials having shorter chain lengths. "A priori", these have the desired low viscosity, but—without the tenside action of the additive— they would involve an excessive danger of tearing the thin film coating. The advantage of the shorter chain lengths lies in the fact that the desired viscosity is achieved even at rather low temperatures. There are other advantages, e.g. in relation to vapor pressure and lower operating temperatures of a light valve.

From the above remarks, the essential parameters typical of embodiments of the invention can be summarized numerically:

| | |
|---|---|
| Specific Resistance without additive | $10^{16}$ Ohm cm at 20 degrees C. $10^{13}$ Ohm cm at 100 degrees C. |
| with additive, depending on concentration | $10^{11}$–$10^{16}$ Ohm cm at 20 degrees C. $10^{9}$–$10^{13}$ Ohm cm at 100 degrees C. |
| Surface Tension without additive | 19–20 mN/m at 45–70 degrees C. |
| with additive Concentration approximately 6% | 15–16 mN/m at 45–70 degrees C. |

Thus, values can be achieved for the basic charge density of approximately 150 $\mu A/m^2$ or for a load with a beam current density of at least 1 $\mu A/cm^2$, and for the viscosity on the order of 1 $Ns/m^2$. The vapor pressure is extremely low, and coating thicknesses of 10 $\mu m$ can be attained easily.

The ability to adjust the many characteristics and actions within broad limits makes it possible to use embodiments of the invention for various purposes. In no way, however, need all the characteristics and actions be of equal importance. For example, in the applications mentioned above, such fluids can be used as a protective layer for organic thin films in electron microscopy and to prevent or reduce electrostatic charging of polymers, where electrical conductivity plays the decisive role, and for the first of these examples, also the tenside action. For the regulation of curing processes relating to photosensitive resists, on the other hand, the chemical properties of these fluids are among the most important criteria. Finally reference should be made to the fluorescence/scintillation phenomena for embodiments of the invention, which can be used for electro-optical conversion processes or for the detection of high-energy radiation.

In FIG. 1 a projection system of the above type which may employ a deformable medium is shown. This medium has a high resistivity and is responsive to a velocity-modulated electron beam. Generally speaking, this projection system, which is illustrated in FIG. 1 of the drawing may comprise an evacuated glass envelope 10 containing an electron gun 11 for producing an electron beam 13 and deflecting it in a rectangular raster over the surface of a light transmitting deformable medium 15 which is within a portion 17 of the transparent container. An enlarged view of this portion of the assembly is shown in FIG. 2. The beam 13 is preferably velocity-modulated by a television signal applied to the deflection means (not shown in the electron gun 11). Deformable medium 15 usually has a central portion 19 of decreased thickness which is coincident with the raster area produced by electrons from beam 13 attracted to a conducting coating 21 on the inner surface of the container portion 17. These same electrons produce deformations in the surface of the deformable medium 15 and the amplitudes of these deformations are a function of the number of electrons deposited by the beam 13 at various points on the surface of medium 15. Thus, the amplitudes of these deformations are usually a function of the modulated electron beam 13.

The deformations on the surface of medium 15 are typically utilized to diffract light from a source 23 in an optical system including a lens 24 which projects an image of light source 23 on the surface of medium 15 through a bar and slit system 25. Another lens 29 images the slits of system 25 on the bars of another bar and slit system 31 if there are no deformations on the surface of deformable medium 15. However, any deformations on such surface diffract the transient light so that it passes through the slits in the system 31 with an intensity that corresponds to the amplitudes of the deformations and hence the amplitudes of the applied modulating signal such as a television signal. The light passing through system 29 is imaged by a projection lens 33 on screen 35 by means of mirror 37. Any of the other suggested matters cited herein may also be used with the embodiments of the present invention.

In summary, one feature of the invention resides broadly in a fluid which contains an organic basic material and at least one organic additive, which can be formed as a thin dielectric coating with an electrostatically deformable surface, and which exhibits increased resistance to radiation damage, characterized by an oligo(phenylenemethylene) resorcinol having the formula $H(C_6H_4CH_2)_{n-1}C_6H_3(OH)_2$ where n is equal to or greater than 3, as the additive.

Another feature of the invention resides broadly in a fluid characterized by an oligophenylenemethylene having the formula $H(C_6H_4CH_2)_mR$ where m is equal to or greater than n and $R=H$ or aryl, as the basic material.

Yet another feature of the invention resides broadly in a fluid characterized by an oligophenylenemethylene with $R=H$, i.e. a terminal methyl group, as the basic material.

A further feature of the invention resides broadly in a fluid characterized by an oligo(phenylenemethylene) with $R=H$ and having the formula $H(C_6H_4CH_2)_xC_6H_4CH_2(C_6H_4CH_2)_yH$, where $x+y+1=n$ as the basic material.

A yet further feature of the invention resides broadly in a fluid characterized by decomposition products in the form of oligomeric ethers.

Yet another further feature of the invention resides broadly in a fluid characterized by an initial concentration of approximately 6% of the additive in the basic material.

An additional feature of the invention resides broadly in a fluid characterized by polystyrol as an additional additive.

A yet additional feature of the invention resides broadly in a fluid characterized by an initial concentration of the polystyrol of less than 10% in the mixture of the basic material and the first additive.

A further additional feature of the invention resides broadly in a fluid characterized by a polystyrol having an average molecular weight between approximately 50,000 and 500,000 as the additional additive.

All of the patents, patent applications, and publications recited herein, if any, are hereby incorporated by reference as if set forth in their entirety herein.

The German Federal Republic application number P 39 04 264.2 from which priority under the international convention is claimed forms a part of this application.

Since basic materials and/or additives also seem suitable for the present invention, relating to a special effect in use, e.g. on the viscosity, surface tension or decomposition and cross-linking, the following examples of the prior art should also be mentioned:

German Federal Republic Patent DE-PS No. 17 20 869 (which is equivalent to British Patent Application Number 1190825) with regard to the basic materials polybenzylnaphthalene, polybenzyltoluene, polyphenylether (although substances containing silicon, in particular silicone and siloxane, seem less well-suited on account of their tendency toward gel formation) and polystyrol as an additional additive;

German Federal Republic Patent DE-PS No. 19 49 212 (which is equivalent to French Patent Application 2.022.255) regarding polybenzyl aromates, including oligophenylenemethylene (polybenzyl toluene) as the basic material:

U.S. Pat. No. 3,288,927 regarding the other basic materials mentioned above (polybenzyl-toluene material);

U.S. Pat. No. 3,317,664 regarding the basic material polybenzylnaphthalene:

U.S. Pat. No. 3,317,665 regarding the basic materials di-, tri- and tetra-benzylphenylene.

All, or substantially all, of the components and methods of the various embodiments may be used with at least one embodiment or all of the embodiments, if any, described herein.

In summary, one aspect of the invention may relate to: fluid having increased resistance to radiation damages. The fluid, which can be used as a thin dielectric coating with an electrostatically deformable surface, as the control coating of a light valve projector, should have optical characteristics and improved. hydromechanical, hydrodynamic, electrical and other physical and chemical properties oriented to the requirements of HDTV. In a fluid composed of an organic base material and at least one organic additive, the additive is an oligo(phenylenemethylene) resorcinol having the formula $H(C_6H_4CH_2)_{n-1}C_6H_3(OH)_2$ where n is equal to or greater than 3. The fluid provides an increase of thermal and electrical conductivity, for action as tenside, action as a radical scavenger and reaction inhibitor and as a hydrogen scavenger, and also for reduction of surface tension, which further provides for expansion of possible applications of oligomeric basic materials.

The invention as described hereinabove in the context of a preferred embodiment is not to be taken as limited to all of the provided details thereof, since modifications and variations thereof may be made without departing from the spirit and scope of the invention.

What is claimed is:

1. A television (HDTV) projection system or the like, said system comprising:
   a container;
   said container having a coating disposed therein;
   said coating having an electrostatically deformable dimension;
   electron beam means for producing an electrical charge on at least said coating as a function of an applied electrical signal and cooperating with said interior to subject said coating to a deforming force to produce deformations in said coating;
   a source of radiant energy:
   said source of radiant energy being disposed to provide radiant energy to said coating;
   an optical system for projecting radiant energy from said source of radiant energy as a function of the deformations in said coating;
   said optical system being disposed for projecting radiant energy from said source of radiant energy to said coating;
   said coating comprising a fluid containing an organic basic material and at least one organic additive;
   said fluid being at least a part of said dielectric coating with said electrostatically deformable dimension;
   said at least one additive comprising an oligo(phenylenemethylene) resorcinol; and
   said optical system for projecting radiant energy for forming an image.

2. An electronic projection system or the like, said system comprising:
   a container;
   said container having a coating disposed therein;
   said coating having an electrostatically deformable dimension:
   electron beam means for producing an electrical charge on at least said coating as a function of an applied electrical signal and cooperating with said interior to subject said coating to a deforming force to produce deformations in said coating;
   a source of radiant energy;
   said source of radiant energy being disposed to provide radiant energy to said coating;
   an optical system for projecting radiant energy from said source of radiant energy as a function of the deformations in said coating;
   said optical. system being disposed for projecting radiant energy from said source of radiant energy to said coating;
   said coating comprising a fluid containing an organic basic material and at least one organic additive;
   said fluid being at least a part of said dielectric coating with said electrostatically deformable dimension;
   said at least one additive comprising an oligo(phenylenemethylene) resorcinol; and
   said optical system for projecting radiant energy for forming an image.

3. A television projection system or the like, according to claim 1, wherein said oligo(phenylenemethylene) resorcinol has the formula $H(C_6H_4CH_2)_{n-1}C_6H_3(OH)_2$ where n is equal to or greater than 3, whereby said fluid exhibits increased resistance to damage from projection radiation.

4. An electronic projection system or the like, according to claim 2, wherein said oligo(phenylenemethylene) resorcinol has the formula $H(C_6H_4CH_2)_{n-1}C_6H_3(OH)_2$ where n is equal to or greater than 3, whereby said fluid exhibits increased resistance to damage from projection radiation.

5. The system according to claim 4, including an oligophenylenemethylene having the formula $H(C_6H_4CH_2)_mR$ where m is equal to or greater than n and R=H or an aryl, as the basic material.

6. The system according to claim 5, wherein said oligophenylenemethylene with R=H, comprises the basic material.

7. A fluid for a television (HDTV) projection system or the like, which system comprises: a container; the container having a coating disposed therein; the coating having an electrostatically deformable dimension: electron beam means for producing an electrical charge on at least the coating as a function of an applied electrical signal and cooperating with the interior to subject the coating to a deforming force to produce deformations in the coating; a source of radiant energy; the source of radiant energy being disposed to provide radiant energy to the coating; an optical system for projecting radiant energy from the source of radiant energy as a function of the deformations in the coating; the optical system being disposed for projecting radiant energy from the source of radiant energy to the coating; the coating comprising a fluid;

said fluid comprising:

an organic basic material and at least one organic additive;

said fluid for being at least a part of the dielectric coating with the electrostatically deformable dimension, said coating being dielectric;

said at least one additive comprising an oligo(phenylenemethylene) resorcinol having the formula $H(C_6H_4CH_2)_{n-1}C_6H_3(OH)_2$ where n is equal to or greater than 3, whereby said fluid exhibits increased resistance to damage from projection radiation.

8. A fluid for a television projection system or the like, according to claim 7, including an oligophenylenemethylene having the formula $H(C_6H_4(CH_2)_mR$ where m is equal to or greater than n and R=H or an aryl, as the basic material.

9. A fluid for a television projection system or the like, according to claim 8, wherein said oligophenylenemethylene with R=H, comprises the basic material.

10. A fluid for a television projection system or the like, according to claim 9, wherein said oligophenylenemethylene with R=H comprises a terminal methyl group.

11. A fluid for a television projection system or the like, according to claim 9, wherein said oligo(phenylenemethylene) with R=H has a formula $H(C_6H_4CH_2)_xC_6H_4CH_2(C_6H_4CH_2)_yH$, where $x+y+1=n$ and which comprises the basic material.

12. A fluid for a television projection system or the like, according to claim 8, including decomposition products in the form of oligomeric ethers.

13. A fluid for a television projection system or the like, according to claim 11, including decomposition products in the form of oligomeric ethers.

14. A fluid for a television projection system or the like, according to claim 7, including an additive in the basic material with an initial concentration of approximately 6%.

15. A fluid for a television projection system or the like, according to claim 13, including an additive in the basic material with an initial concentration of approximately 6%.

16. A fluid for a television projection system or the like, according claim 7, including polystyrol as an additional additive.

17. A fluid for a television projection system or the like, according to claim 15, including polystyrol as an additional additive.

18. A fluid for a television projection system or the like, according to claim 17, including an initial concentration of the polystyrol of less than 10% in the mixture of the basic material and the first additive.

19. A fluid for a television projection system or the like, according to claim 17, wherein said polystyrol comprises additional additive and said polystryrol has an average molecular weight between approximately 50,000 and 500,000 and an additional additive.

20. A fluid for a television projection system or the like, according to claim 18, wherein said polystyrol comprises additional additive and said polystryrol has an average molecular weight between approximately 50,000 and 500,000 and an additional additive.

21. A fluid having resistance to projection radiation being projected therethrough, said fluid comprising:

an organic basic material and at least one organic additive;

said fluid for being at least a part of a dielectric coating with an electrostatically deformable dimension;

said at least one additive comprising an oligo(phenylenemethylene) resorcinol having the formula $H(C_6H_4CH_2)_{n-1}C_6H_3(OH)_2$ where n is equal to or greater than 3, whereby said fluid exhibits increased resistance to damage from projection radiation.

* * * * *

UNITED STATES PATENT AND TRADEMARK OFFICE
CERTIFICATE OF CORRECTION

PATENT NO. : 4,954,896

DATED : September 4, 1990

INVENTOR(S) : Stefan MAYER and Susanne SCHMIDT

It is certified that error appears in the above-identified patent and that said Letters Patent is hereby corrected as shown below:

In column 3, line 13, after the first instance of 'C', please delete ".".

In column 3, line 13, after the second instance of 'C', please delete ".".

In column 4, on approximately line 32, under the first half of formula (5), please insert -- Keto Form of Additive --.

In column 4, on approximately line 39, under the second half of the formula (5) please insert -- Hydrogenated Form of Additive --.

In column 4, line 52, after 'or', please delete "interfaced" and insert --interfacial--.

In column 5, in the chart on line 11, after every instance of 'C', please delete ".".

In column 7, line 33, after 'improved', please delete ".".

In column 8, line 64, after 'dimension', please delete ":". and insert --;--.

Signed and Sealed this

Fourteenth Day of January, 1992

*Attest:*

HARRY F. MANBECK, JR.

*Attesting Officer*  *Commissioner of Patents and Trademarks*